United States Patent [19]
Gieraths

[11] Patent Number: 4,523,196
[45] Date of Patent: Jun. 11, 1985

[54] TEST EQUIPMENT FOR A SYNTHETIC APERTURE RADAR SYSTEM

[75] Inventor: Wolfgang Gieraths, Friedrichshafen, Fed. Rep. of Germany

[73] Assignee: Dornier System GmbH, Friedrichshafen, Fed. Rep. of Germany

[21] Appl. No.: 348,687

[22] Filed: Feb. 16, 1982

[30] Foreign Application Priority Data

Mar. 27, 1981 [DE] Fed. Rep. of Germany ....... 3112112

[51] Int. Cl.³ .............................................. G01S 7/40
[52] U.S. Cl. ................................. 343/17.7; 343/5 CM
[58] Field of Search ............................ 343/17.7, 5 CM Primary Examiner—T. H. Tubbesing
Assistant Examiner—Gilberto Barrón, Jr.
Attorney, Agent, or Firm—Ralf H. Siegemund

[57] ABSTRACT

The test equipment for a synthetic aperture radar (SAR) system is provided with an input and output connector (6) and is composed of a signal loop (3) arranged between the input and output connector (6) and electromagnetically reproduces these pulses or signals (4) emitted from a SAR system (2) in the absence of a SAR antenna (18). The input connector (6) is electrically connected with a circulator (5) which is integrated into the signal loop (3) and which combines the incoming and outgoing pulses or signals (4) to and from the SAR system (2). The signal loop (3) is composed of a forward branch (7) and a backward branch (10), the forward branch (7) being composed of a multitap time-delay and reproducing different travel times of the pulses or signals (4), while the backward branch (10) in the form of a bus (9) combines the delayed pulses or signals (4). The ends of the forward and backward branches (7 and 10) are terminated by their wave impedances (11, 12) and between them is arranged a crossbar matrix (13) onto which can be set the point target modules (14).

15 Claims, 7 Drawing Figures

TEST EQUIPMENT FOR A SYNTHETIC APERTURE RADAR SYSTEM

The invention relates to test equipment for a synthetic aperture radar system.

Synthetic Aperture Radar (SAR) is increasingly used in the advancing science of civil and military terrestrial and air reconnaissance, both from aircraft and from satellites. The operation of such SAR systems involves the rapid translational motion of the equipment itself, i.e., of its carrier, such as aircraft and satellites. In principle, these radar systems assign the travel times of maximum frequency pulses, in the manner of known radio ranging and detection techniques, to the receiver signals from image points in the distance coordinate. Doppler shifts in the azimuth or in the direction of flight are used, which receives the reflected transmitter signals due to the relative motion of the radar targets.

In order to test such SAR systems for their overall operation, the testing would have to take place each time together with a carrier (aircraft or satellite) because a total operational test is not possible on a spatially fixed test stand wherever the associated antenna(s) must be included in the testing process. However, such a carrier-related testing of these radar systems is unrealistic because the expenditure in equipment (use of the carrier) and especially the costs entailed are unjustifiable.

This being the case, it is the object of the invention to provide test equipment making it possible to carry out a spatially fixed partial testing of one or more SAR systems, nearly as meaningful as a carrier-borne test, the antenna(s) being excluded from the test procedure. The test equipment reproduces electromagnetically all the properties of the receiver signals of an SAR radar system which are found in the realistic actual use of an SAR system. In addition to those functional characteristics, the test equipment also is easily transportable and easy to handle. Again, the test equipment when in a special form is compact and sparing of electrical power and has such properties as to be suitable for fixed integration into an SAR system.

The invention offers the advantage that thereby SAR systems can be operationally tested at will at the site of manufacture and from there at warehouses until it is integrated in its carrier, and there again, and that the typically required laboratory equipment and substantial installations for such purposes no longer are needed. Due to the possibility thus achieved of repeatable and easily implemented operational testing of one or more of such complex SAR systems, a substantial saving in time and costs is achieved. In the specialized embodiment wherein the test equipment is solidly integrated as a sub-unit of the radar into the same, and where during the flight and operation of the radar a testing cycle can be interposed for a brief time and at desired intervals, this test equipment can replace in part those testing procedures which consist of flying over specially calibrated radar reflectors set up on the ground for this purpose.

The test equipment as a whole represents a signal loop reproducing the paths of pulses emitted by a SAR transmitter to one point target or a sum of point targets and received by a SAR receiver while excluding the antenna of the SAR system. This signal loop is composed of a circulator combining the outgoing and incoming pulses and signals, respectively, at the input of the SAR system, of a forward branch reproducing the different travel times by means of a multi-tap time-delay circuit, and of a backward branch which in the form of a bus combines the delayed pulses or signals. Both branches are terminated at their ends by their characteristic impedances. A crossbar matrix is mounted between the two branches and receives point target simulators (point target modules) designed as plug-in modules. The point target modules plugged into the crossbar matrix by means of their positions on the matrix provide a visual representation of a point target pattern in the target field of a SAR system required to be reproduced during the testing procedure. The time delays caused by the motion of a SAR system and the time-shifted entry of the point targets in the field of view of the SAR system are obtained from a programmed digital counter chain. By providing several inputs to the test equipment, it is also possible to hook up SAR systems of different operational frequencies.

At least two noise sources (noise generators) or sources with quasi-stochastic signals are provided to simulate spurious effects or signals such as background noise (clutter), phase and amplitude fluctuations (speckle) and travel time errors. As all the components contributing to reproduce the signal properties and simulating the spurious effects can be calibrated with respect to adjustment, read-out, constancy and accuracy, the test equipment also can be used for calibrating the SAR systems. Electronic accessories, for instance reverberating members, provide an artificial enlargment of a simulated or reproduced target in the point target modules. Moreover, a vertical rail or line mounted in the crossbar matrix provides a gray wedge, a series of point target simulators with stepped dampings being hooked onto this rail or line.

The invention will be further illustrated by reference to the accompanying drawings, in which:

FIG. 1 is a block diagram of one embodiment of testing equipment for a SAR system;

FIGS. 2a, 2b, and 2c are test parameters during the operation of a SAR system,

Figure 1:
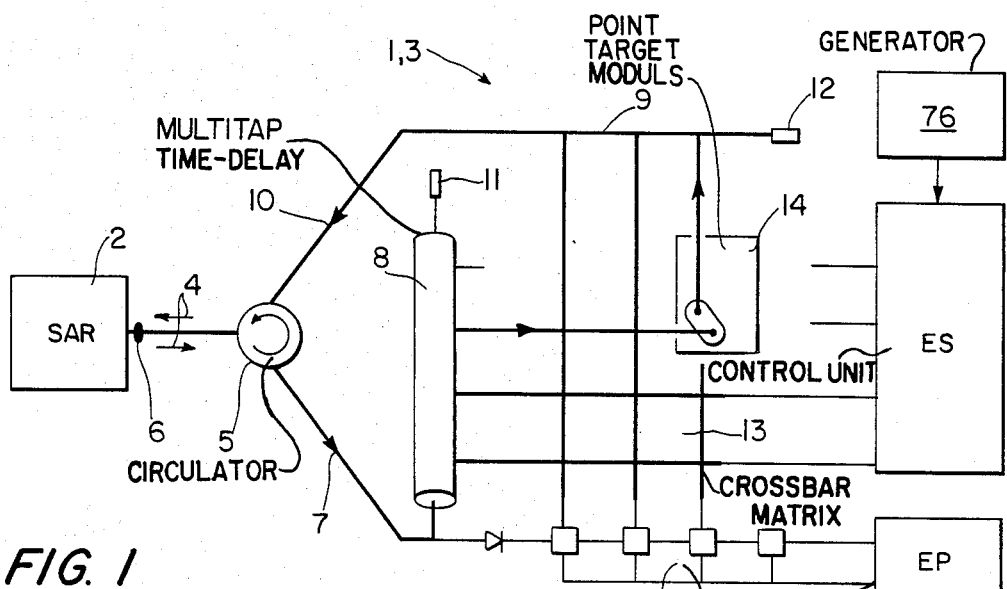
Figure 2A:
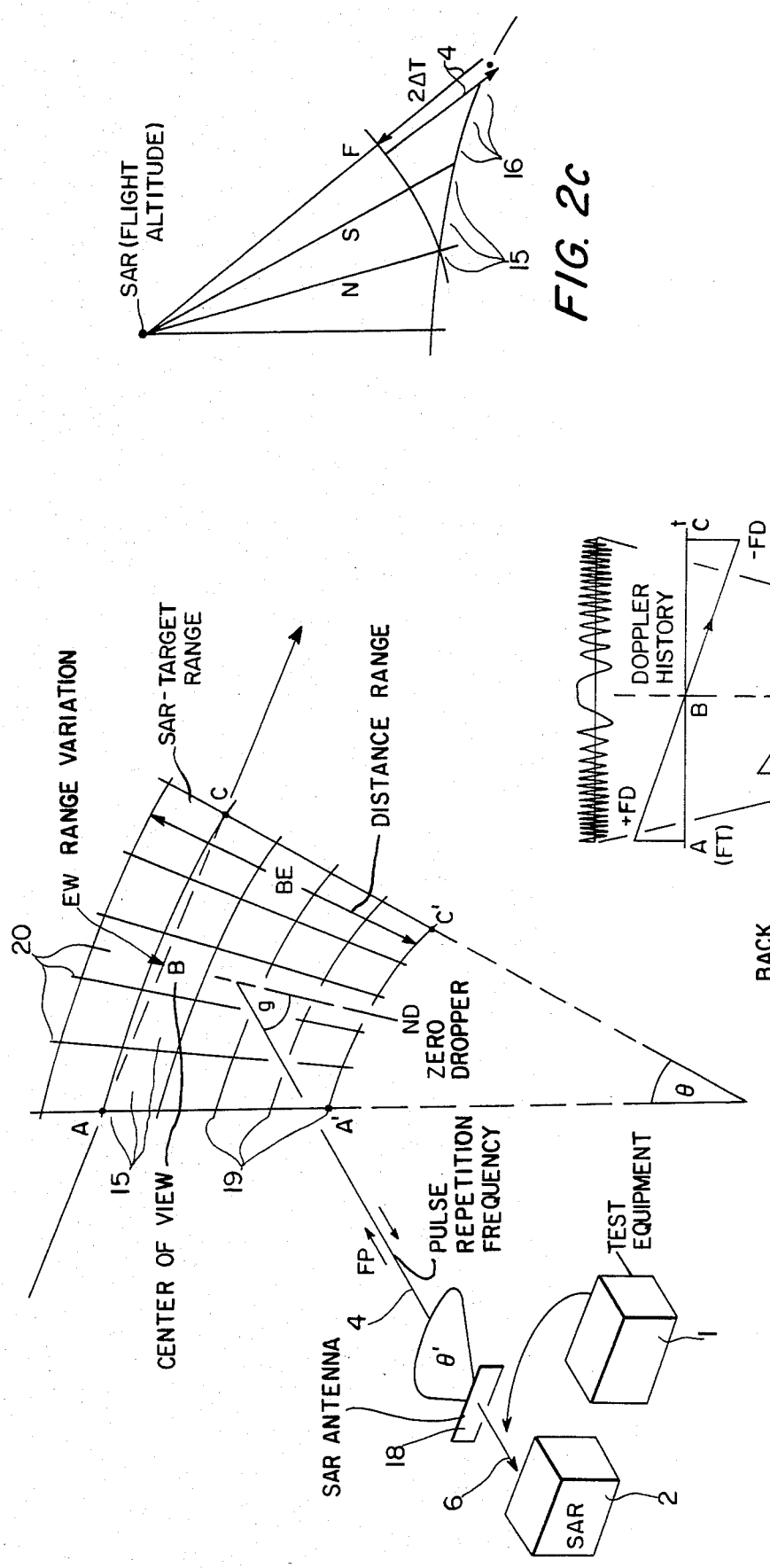

FIG. 1 shows a block diagram for test equipment 1 for a SAR system 2 (FIG. 2a). As a whole, the test equipment 1 represents a signal loop 3 reproducing and simulating the path of pulses and signals respectively (FIGS. 2a and 2c) emitted by a SAR transmitter (i.e., from the SAR system with antenna) toward one point target or a sum of point targets (FIG. 2c) and received in a SAR receiver, while an SAR antenna (FIG. 2a) is excluded or bypassed. Beyond a circulator 5 mounted at one end of the signal loop 3 and combining the outgoing and incoming pulses and signals 4 respectively at the input terminal or antenna hook-up 6 (also FIG. 2a), the signal loop 3 is composed of a forward branch 7, which reproduces the different travel times of the pulses or signals 4 by means of a multitap time-delay 8, and of a backward branch 10 in the form of a bus 9 combining the delayed pulses or signals 4. Both branches 7 and 10 are terminated by their characteristic impedances 11, 12. A crossbar matrix 13 is mounted between the two branches 7 and 10 which receives point target simulators (point target modules) 14 designed as plug-in modules. The point target modules 14 so plugged into the crossbar matrix 13 by their position in the matrix provide a visual display of a point target pattern in a SAR target field (FIGS. 2a and 2c) which must be reproduced or simulated during the testing. Time delays caused by the motion proper of the SAR system 2 and the time-shifted entry of the nearest and farthest point targets 15, 16 (FIG. 2c) into the field of view of the SAR system, are obtained from a programmed digital counter chain.

Figure 2B:
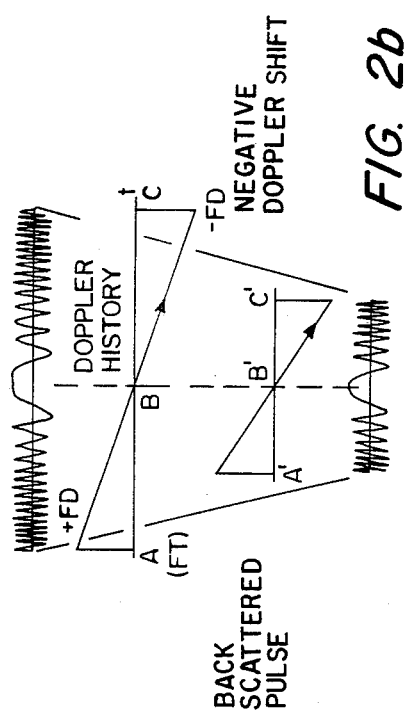
Figure 2C:
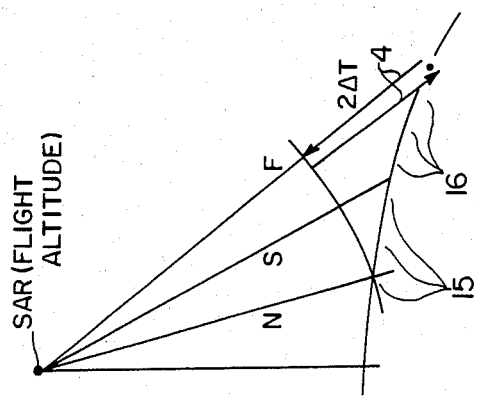

FIGS. 2a, 2b, and 2c show test-related operational data of a SAR system 2 at a given flight altitude. A field of view detected instantaneously at an average angle of incidence g due to the characteristics of the SAR antenna 18 (FIG. 2a) is divided by the lines of equal distance 19 and the lines of equal Doppler shift 20 quasiorthogonally as the SARA target field. A point target 15 passing through this field of view, i.e., the sighting sweep from A to C (also see the directional arrow in FIG. 2a) because of the motion of a SAR carrier (not shown in the Figure), changes its relative distance from the SAR system by a range variation of EW. When the point target 15 enters the field of view of the SAR antenna 18 (at A), the frequency of the back-scattered pulse or signal FT (FIG. 2b) is shifted by a positive maximum Doppler shift $+FD$ with respect to the transmitted SAR carrier frequency FT (approaching target). As the point target 15 moves inside the field of view, namely in the center B of this field of view, the Doppler shift drops toward null (zero Doppler ND), and it will leave the field of view or the sighting sweep of the SAR system 2, that is of its antenna 18, at a maximum negative Doppler shift $-FD$ (receding target), whereupon its Doppler history is over in the SAR system 2 (FIG. 2b). A target closer to the SAR system 2 passes approximately through the same Doppler history at the lower limit of the field of view or sighting sweep between A' and C', from $+FD$ to $-FD$, in a lesser time (FIGS. 2a and 2b). The times for Doppler histories of farther and nearer targets are determined by the velocity proper of the SAR system 2, i.e., of its carrier, by the projection $\theta$ of the azimuth antenna aperture angle $\theta'$ on the target plane A, A', C,C' and by the distance range BE (see arrow direction). The highest frequency SAR pulses or signals 4 undergo a substantial path attenuation and travel time delay on the path from the SAR antenna 18 to the point targets 15, 16 (FIGS. 2a, 2c) and back.

The signal properties below which must be reproduced or simulated are significant for the test equipment 1 connected to the input connector or antenna hook-up 6:

the path attenuation of the pulses or signals 4 going to the point targets 15 to 16 and returning from them, respectively;

the travel times resulting therefrom, of which only the portion denoted by 2ΔT shown in FIG. 2c is reproduced or simulated because the same portions for the near (N) and the far (F) point targets 15, 16 are irrelevant for the testing procedure;

the Doppler history (FIG. 2b);

the distance shift EW; and the radar reflection cross-section (which cannot be represented) of the point targets 15 to 16.

Also, the following five values must be manually set once at the test equipment so the testing can be carried out:

the pulse or signal attenuation; it is determined in part by the average range S;

the transmitter output;

the receiver sensitivity;

the time t of the Doppler history for the average range S;

the number of pulses or signals reflected by a single target during one Doppler history; and a number of pulses or signals which must be selected and hence a time shift by which the target points entering the SAR target area are offset with respect to earlier target points.

Figure 3:
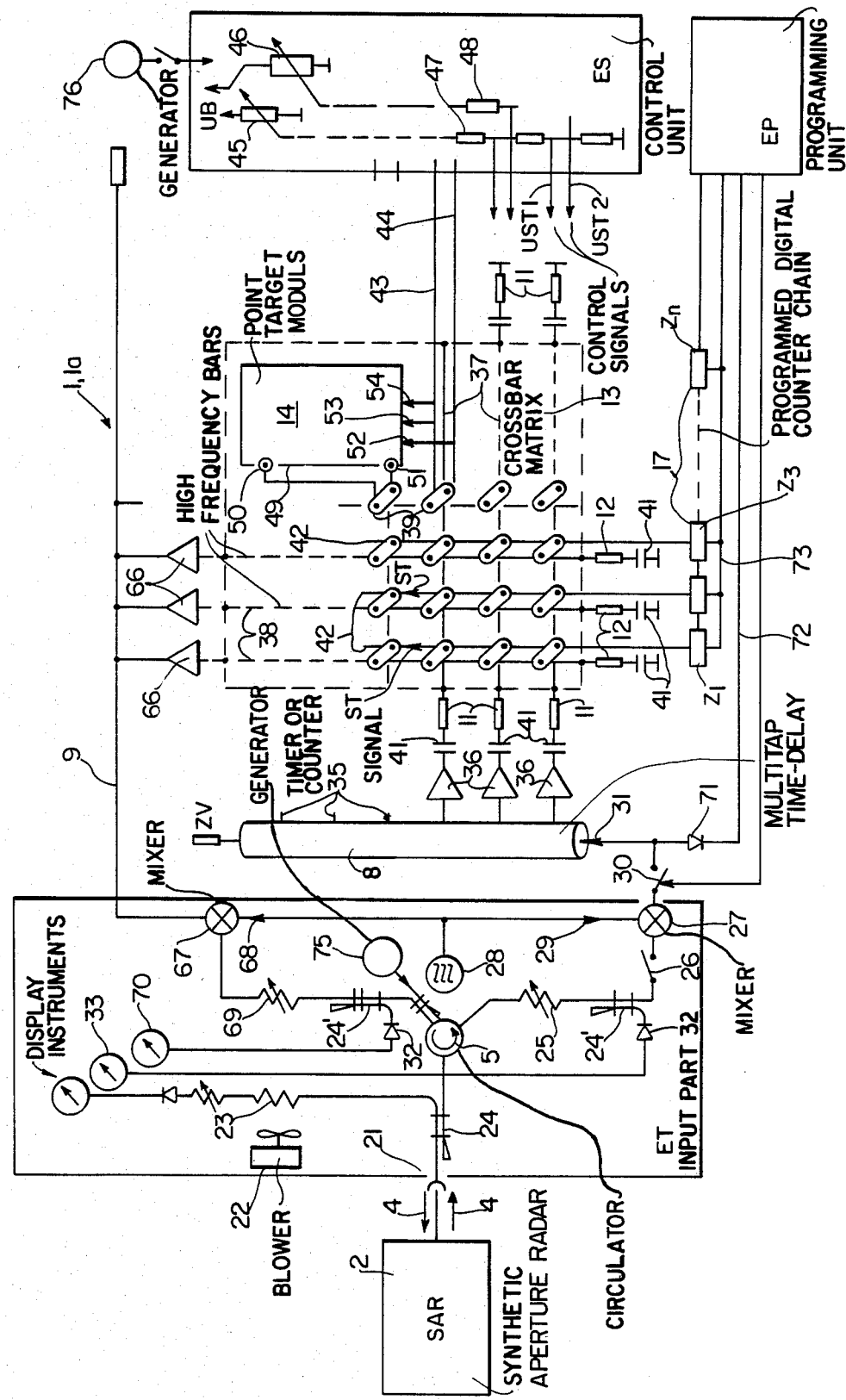
FIG. 3 is a circuit diagram according to FIG. 1 in greater detail.

FIG. 3 shows in more detail the block diagram of FIG. 1 of the signal loop 3 of a test equipment 1 in the form of an electronic circuit 1a. The high-frequency pulses or signals 4 emitted by the SAR system 2 first pass through an input connector 21 provided at the test equipment 1 (or 1a) and then arrive at the input part ET of the test equipment 1 which is specifically designed for the particular operating frequency of the SAR system 2. Most of the transmitter power, which ranges from a few watts to about a kilowatt, is dissipated in a terminal resistor 23 cooled by a blower 22. Part of this power is coupled out by a directional coupler 24 of about 20 db and is fed through the circulator 5 (also see FIG. 1), through an adjustable attenuator 25 and a switch 26 to a mixer 27. There, the partial power is mixed by means of a heterodyning frequency 29 generated in a master oscillator 28 to a first intermediate-frequency (IF) position 31 of about 60 MHz. The power of the partial amount set at the attenuator 25 passes through a directional coupler 24' of about 10 db and a rectifier 32 and then can be displayed and monitored on a display 33. The mixed pulses or signals pass through the switch 30 to a tapped delay line 8 where they are delayed by 2ΔT (FIG. 2c) of the advance/lag experienced by the SAR pulses or signals 4 in real operation. The delay line 8 can be implemented by a cascade of interdigital filters of the acoustic surface wave filter type provided with taps 35 or permitting such tap installations. Both as regards aircraft and satellite SAR systems, the total delay times which must be made available are in the range of 500 microseconds. Following equidistant partial delays which can be set by selecting the taps 35 at the delay line 8, and after level balancing by means of a series of amplifiers 36, the pulses or signals are fed to the high-frequency bars 37 (for instance in the horizontal arrangement of the Figure) and input lines of the crossbar matrix 13, the bars thereby reproducing or simulating a distance grid in the field of view A-C (FIG. 2a) of a SAR system 2. High-frequency bars or output lines 38 mounted orthogonally to the high-frequency bars and input lines 37 in the crossbar matrix 13 reproduce a time grid of the motion of the SAR system 2. Point target simulators or point target modules 14 are plugged into the crossing points of the high-frequency bars 37 and 38. The plug-in site of the point target modules 14 in the crossbar matrix 13 determines for the test operator in graphical manner the positions of target points 15 to 16 entering earlier or later the field of view A-C of a SAR system 2 and at various distances.

Due to plugging-in a point target module 14, a pulse (signal) arriving from the high frequency bar 37 (horizontal arrangement) in the 60 MHz position is mixed into a 110 MHz position and switched onto one of the high-frequency bars 38 (vertical arrangement). All high-frequency bars 37 and 38 of the crossbar matrix 13 are terminated by their characteristic impedances 11, 12 to avoid resonances and these impedances are blocked against DC by the capacitors 40, 41.

Auxilliary control lines 42 feeding a time signal (counter signal) ST from the counter chain 17 (also FIG. 1) to the crossing points 39 run parallel to the (vertical) high-frequency bars 38. Two auxiliary control lines 43, 44 feeding two control signals UST1, UST2 from a neighboring control unit ES to the crossing points 39 extend parallel to the (horizontal) high-frequency bars 37 at each bar. The control signals UST1 and UST2 are derived in the control unit ES from a power source potential UB and are set at potentiometers 45 and 46 for all the auxiliary control lines 43 and 44 and are stepwise tapped by means of divider strings 47 and 48. In this manner the azimuth antenna aperture angle $\theta'$ and the angle of incidence g (FIG. 2a) are reproduced.

Figure 4:
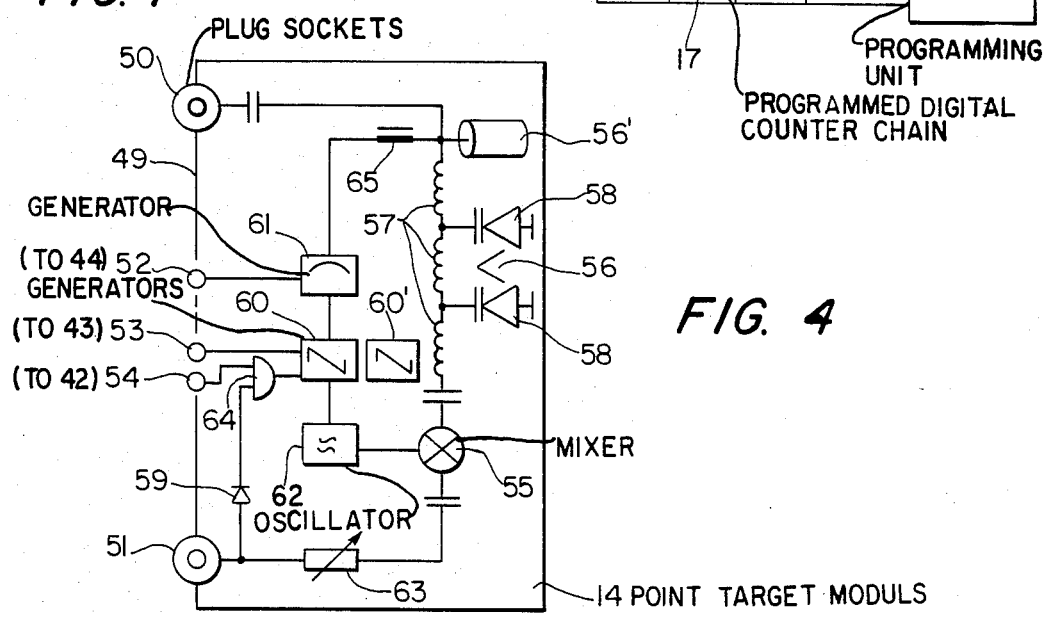
FIG. 4 is a point target module according to FIG. 3 in greater detail.

A point target module 14 is shown in detail in FIG. 4 at the crossbar matrix 13 of FIB. 3. A plug-in strip 49 containing five plug sockets and input terminals 50, 51, 52, 53, and 54, with the input and output sockets 50 and 51 of the coaxial type, is mounted to the point target module 14. The point target module 14 is plugged by means of this plug-in strip onto the crossbar matrix 13 and is electrically connected by the plug sockets 50, 51, 52, 53, and 54 with the high-frequency bars and signal lines 37, 38 and the auxiliary control lines 42, 43, and 44 (FIG. 3). The function-determining components of the point target module 14 are a mixer 55, a voltage-controlled time-delay 56 composed of three inductors 57 and two varactor diodes 58, a diode 59, two sawtooth generators 60, 60', a voltage-controlled function generator 61, a voltage controlled quartz frequency generator or Doppler oscillator 62 and an adjustable attenuator 63.

A pulse coming in through the input terminal 51, namely an input signal of about 60 MHz, is detected at the diode 59 and in coincidence with a time or counter signal ST applied to the plug socket 54 via control line 42 will set at an AND gate 64 the starting time for the sawtooth generator 60. The duration of the sweep of the tooth and hence of the Doppler history is fed to the sawtooth generator 60 via control line 43 through the plug socket 53 in the form of the DC of the control signal UST1 (FIG. 3). The second DC of the control signal UST2 (FIG. 3) arrives on control line 44 and enters through the plug socket 52 and determines the potential swing of the function generator 61. The function potential is synchronous with the Doppler history and is derived in time from the sawtooth generator 60. The function potential itself is fed through a high-frequency choke 65 to the time delay 56 where it effects the reproduction or the simulation of the distance shift EW (FIG. 2). By means of its vertical potential the sawtooth generator 60 controls the detuning of the quartz frequency generator or Doppler oscillator 62 by the amount of the Doppler shift $+/-FD$ (Doppler history). The center frequency of the quartz oscillator 62 is at about 50 MHz. The signal at 50 MHz $+/-FD$ is fed to the mixer 55. The amplitude of the incoming SAR pulse or signal 4 (FIGS. 1, 2a, and 3) is so adjusted at the attenuator 63 as to correspond to the radar reflection cross-section of the point target 15 or 16 to be reproduced. Accordingly, the SAR pulse 4 is mixed with the instantaneous frequency of the quartz oscillator 62 into a 110 MHz pulse containing the instantaneous value of the Doppler history. This pulse or signal is delayed by an instantaneous shift of the distance EW (FIG. 2a) in the time delay 56 as determined by the function generator 61, the frequency-selective property of the time delay 56 blocking the undesired mixing product of about 10 MHz.

Figure 5:
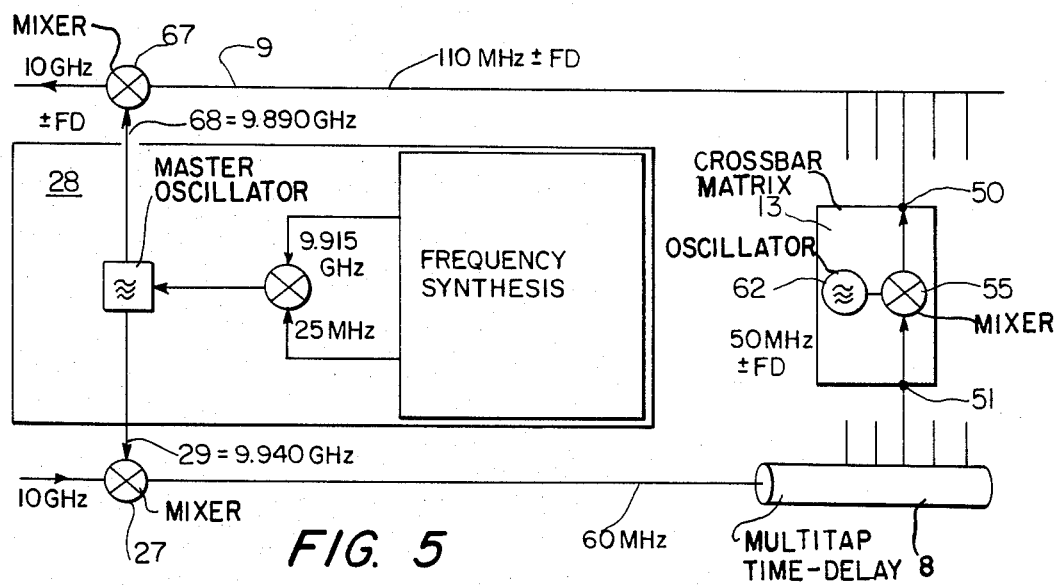
FIG. 5 is a frequency schematic of the test equipment.

The 110 MHz $+/-FD$ pulse prepared in the manner described is fed back through the coaxial output connector 50 into the crossbar matrix 13 (FIG. 3). After the features determined by the selection of the crossing points 39 (FIG. 3) have been imparted to the pulses, they are fed through the high-frequency bars 38 and after amplification in the amplifiers 66 on the bus 9 to a further mixer 67 (FIG. 3) mounted in the input part ET. There the pulses are mixed back by means of a second heterodyne frequency 68 generated by the master oscillator 28 into the frequency position of the SAR carrier frequency FT. The level of these SAR receiver pulses or signals 4 so prepared is attenuated in a second attenuator 69 mounted in the input part ET in cooperation with the further attenuation at the directional coupler 24 to a desired value (typically of the order of $-115$ db) and is monitored in a further display instrument 70. In the known manner of frequency synthesis technology, the master oscillator delivers the two local frequencies 29 and 68 which are coherent with respect to a common fundamental frequency and which evince at least the same frequency constancy C as the SAR carrier frequency FT, namely $C=1.10\times 10^{-7}$ to $10^{-8}$ approximately. The frequency schematic of the test equipment 1 is shown in FIG. 5 for an illustration of $FT=10$ GHz and a pulse bandwidth less than or equal to 5 MHz. No constraints of coherence are placed on the Doppler oscillator 62.

The time or counter signals ST simulating the motion of the SAR system 2 (FIGS. 1 and 3) are generated by a programming unit EP and a counter chain 17 by known digital techniques. By closing the switches 26 and 30, the testing beings. The incidence of the first pulse is detected by a diode 71 and is relayed through a line 72 to the programming unit EP. The counters $Z_1$ through $Z_n$ in the counter chain 17 are set through the line 73 at an arbitrary number $Q=NP:M$, from which thereafter they count down in synchronism with the pulse repetition frequency FP until zero. When the figure zero is reached, it terminates the test cycle at the counter $Z_n$ and the (selected) figure M together with the pulse repetition frequency FP determines the time spacings between the point targets 15 or 16 (FIGS. 2a and 2c) mounted on the auxiliary rails 42. When the counting process is started at the counter $Z_3$, same applies a signal "logic 1" for the duration of one pulse train spacing 1:FP to the auxiliary control line 42 associated with it and hence to the input of the AND gate 64 in a point taget module 14 on this rail (FIGS. 3 and 4). The coincidence of the incoming pulses or signals 4 with the time signal ST at the point target 15 or 16 initiates there the sequences described. The test cycle can be repeated by manually closing the switch 20.

The sawtooth voltage of an additional sawtooth generator 60' mounted in the point target module 14 can be selectively superposed to the sawtooth voltage from the sawtooth generator 60. In this manner, the time and amplitude function of the control voltage of the voltage-controlled Doppler oscillator 62 in the particular point target module 14 is so modified by the constraints imposed on it by the control unit FS that the single target so represented provides the illusion of motion in the SAR picture.

A coaxially shown reflection line 56' indicated in FIG. 4 implements the pulse reverberation and hence an apparent enlargement of the point target.

Two generators 75 and 76 (FIG. 3) produce noise or quasi-stochastic signals. The generator 75 generates background noise (clutter) in the SAR picture. By means of a spurious signal or a spurious magnitude from the generator 76, fluctuations in the target reproduction can be obtained or induced by superposing such a spurious magnitude on the signals UST1 and/or UST2.

It will be obvious to those skilled in the art that many modifications may be made within the scope of the present invention without departing from the spirit thereof, and the invention includes all such modifications.

What I claim is:

1. Test equipment, for a synthetic aperture radar (SAR) system having input/output terminals normally connected to an antenna, the antenna being disconnected from the terminals during a test, the test equipment provided for generating a selectible test pattern for simulating various targets, comprising, an input circuit connected to the terminals for receiving pulses or signals emitted by the SAR system in the absence of a SAR antenna, and for returning simulated response signals to the SAR system, and including a circulator for combining incoming and outgoing pulses or signals of the SAR system;

a signal loop connected to the input circuit and being composed of a forward branch and a return branch combined at said circulator, the forward branch including means for reproducing the varying travel times of the pulses or signals issued by the SAR system comprising of a multitap time-delay, thereby providing a plurality of differently delayed signals, said return branch including a bus for combining delayed pulses or signals;

the loop further including a crossbar matrix, having input lines connected respectively to the taps of said multitap delay and having output lines, seperated from the input lines but defining cross-points therewith and being connected to said bus of said return branching;

the matrix further including target module means operating as point target modulators, for selectively interconnecting an input line with an output line of said matrix at a crosspoint thereof, so that a loop is established through the forward and return branches and at least one target module at the matrix crosspoint;

said two branches being terminated at their ends by their characteristic impedances.

2. Test equipment as in claim 1, wherein said input circuit includes a directional coupler for connection to the terminals, cooled resistance means connected to the coupler for dissipating a portion of the signal energy, a branch for feeding a remaining portion of the signal energy from said circulator to the forward branch, the branch for feeding including a first mixer, there being an oscillator connected to the first mixer, the input circuit further including circuit means for connecting the return branch to the circulator, the circuit means including a second mixer connected to the same oscillator.

3. Test equipment as in claim 1, further including timing means for providing timing signals effective seperately on each of the matrix output line for controlling respectively any target module thereon as to simulation of entry in a simulated field of view.

4. Test equipment as in claim 3, the timing means including counting means, the equipment further including programming means for setting the counting means in simulation of range and azimuthal spatial distances of target points as simulated by the target module means, the counter means further connected for counting singal pulses from the SAR unit.

5. Test equipment as in claim 1, wherein the target module means for each matrix crosspoint to be interconnected includes attenuating means and variable frequency means for simulating Doppler effects, and including oscillating means and mixer means for combining the output of the oscillatory means with the signal arriving on the respective input line.

6. Test equipment as in claim 5, including control means separately effective on target module means placed on crosspoints respectively along the input lines of the matrix for controlling said target module means producing Doppler effect variations.

7. Test equipment as in claim 5, the target module means each including a sawtooth generator for voltage control of said oscillator means, the output of the said oscillator being used for frequency modulating the signal that arrives at the respective input line.

8. Test equipment as in claim 7, wherein a target module includes delay means, for the Doppler modulated signal as received through the respective input line, the output of the delay means connected to the respective output line.

9. Test equipment as in claim 8, wherein target means further including echo simulating means including a coaxial reflection line connected to the delay means for setting an echo simulation into the respective output line.

10. Test equipment as in claim 7, including noise simulation means for superimposing signals representing noise, to the output of the saw tooth generator.

11. Test equipment as in claim 7, including timing means and a plurality of control lines along the respective output lines, for starting sawtooth oscillators of target modules on the respective output lines, and control line means along the input lines for connections to target modules thereon for stopping saw sweeps of the respective saw tooth generators.

12. Test equipment as in claim 7, wherein the target module means further includes a function generator being connected to the sawtooth generator, for adding a distance shift simulating signal to the signal set by the target module into the respective output line.

13. Test equipment as in claim 1, including noise generating means connected to said circulator, for affecting the respective signal as returned therethrough by the return branch for simulating background clutter or smear of target position or both.

14. Test equipment as in claim 1 wherein the module means for each matrix crosspoint to be interconnected includes attenuating means and variable frequency means for simulating Doppler effects, and including oscillating means and mixer means for combining the output of said oscillating means with the signal arriving on the respective input line, said mixer and mixer means all operating with the same intermediate frequency range.

15. Test equipment as in claim 1, further including a noise generating means there being control lines along the input lines for controlling the respective target modules thereon, the noise generating means being connected to the control lines for setting signals representing noise into the control lines.

* * * * *